US008728369B2

(12) United States Patent
Alberg et al.

(10) Patent No.: US 8,728,369 B2
(45) Date of Patent: May 20, 2014

(54) METHOD OF MAKING AN AUXETIC MESH

(75) Inventors: Randall L. Alberg, Maplewood, MN (US); Philip G. Martin, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 649 days.

(21) Appl. No.: 12/964,845

(22) Filed: Dec. 10, 2010

(65) Prior Publication Data

US 2011/0156314 A1 Jun. 30, 2011

Related U.S. Application Data

(60) Provisional application No. 61/291,060, filed on Dec. 30, 2009.

(51) Int. Cl.
*D01D 5/20* (2006.01)

(52) U.S. Cl.
USPC .......................................... 264/167; 244/99.8

(58) Field of Classification Search
USPC .......................................... 264/167; 244/99.8
See application file for complete search history.

(56) References Cited

U.S. PATENT DOCUMENTS

| 4,004,584 | A | 1/1977 | Geaney |
| 4,187,390 | A | 2/1980 | Gore |
| 4,233,290 | A | 11/1980 | Ferrari et al. |
| 4,319,567 | A | 3/1982 | Magidson |
| D267,985 | S | 2/1983 | Huber |
| 4,384,577 | A | 5/1983 | Huber et al. |
| 4,454,881 | A | 6/1984 | Huber et al. |
| D285,374 | S | 8/1986 | Huber et al. |
| 4,668,557 | A | 5/1987 | Lakes |
| 4,747,991 | A * | 5/1988 | Bishop .......................... 264/504 |
| 4,850,347 | A | 7/1989 | Skov |
| 4,860,737 | A | 8/1989 | Lang et al. |
| 4,873,972 | A | 10/1989 | Magidson et al. |
| 4,995,382 | A | 2/1991 | Lang et al. |
| 5,015,574 | A | 5/1991 | Furutani et al. |
| 5,035,713 | A | 7/1991 | Friis |

(Continued)

FOREIGN PATENT DOCUMENTS

| CN | 2714284 | 8/2005 |
| EP | 0059049 B1 | 9/1982 |

(Continued)

OTHER PUBLICATIONS

International Application No. PCT/US2010/059806 Search Report dated Aug. 30, 2011.

(Continued)

*Primary Examiner* — Joseph S Del Sole
*Assistant Examiner* — John Robitaille
(74) *Attorney, Agent, or Firm* — Karl G. Hanson

(57) ABSTRACT

A method of making an auxetic mesh, which method includes: (a) extruding a polymeric material 60 onto an open casting surface 58 that has an intended pattern 62 disposed therein, the pattern 62 being configured to create an auxetic mesh 20; (b) wiping off excess extruded polymeric material 60 from the open casting surface 64; (c) removing the cast mesh 20 from the open casting surface 64 after the excess polymeric material 60 has been wiped off; and (d) removing any residual polymeric material that is not of the intended mesh pattern 20. The method allows for the continuous production of auxetic meshes.

17 Claims, 6 Drawing Sheets

(56) References Cited

U.S. PATENT DOCUMENTS

| | | | |
|---|---|---|---|
| 5,098,755 | A | 3/1992 | Tanquary et al. |
| 5,108,413 | A | 4/1992 | Moyers |
| 5,334,903 | A | 8/1994 | Smith |
| 5,352,508 | A | 10/1994 | Cheong |
| 5,547,302 | A | 8/1996 | Dornbusch et al. |
| 5,613,334 | A | 3/1997 | Petrina |
| 5,780,048 | A | 7/1998 | Lee |
| 6,098,201 | A | 8/2000 | Boros, Sr. |
| 6,117,518 | A | 9/2000 | Cawse et al. |
| 6,372,932 | B1 | 4/2002 | Kepert et al. |
| 6,403,197 | B1 | 6/2002 | Skov et al. |
| 6,412,593 | B1 | 7/2002 | Jones |
| 6,571,797 | B1 | 6/2003 | Magidson et al. |
| 6,878,320 | B1 | 4/2005 | Alderson et al. |
| 6,942,894 | B2 | 9/2005 | Alberg et al. |
| 8,021,628 | B2 | 9/2011 | Feisel et al. |
| 2001/0015205 | A1 | 8/2001 | Bostock et al. |
| 2002/0045041 | A1 | 4/2002 | Dillon et al. |
| 2003/0042176 | A1 | 3/2003 | Alderson et al. |
| 2003/0089437 | A1 | 5/2003 | Poitras |
| 2003/0124279 | A1 | 7/2003 | Sridharan et al. |
| 2003/0205231 | A1 | 11/2003 | Shigematsu et al. |
| 2003/0219866 | A1 | 11/2003 | Kruijer |
| 2004/0039453 | A1 | 2/2004 | Anderson et al. |
| 2004/0178544 | A1 | 9/2004 | Jackson et al. |
| 2004/0180186 | A1 | 9/2004 | Jackson et al. |
| 2004/0186588 | A1 | 9/2004 | Sridharan et al. |
| 2005/0142331 | A1 | 6/2005 | Anderson et al. |
| 2005/0159066 | A1 | 7/2005 | Alderson et al. |
| 2005/0287371 | A1 | 12/2005 | Chaudhari et al. |
| 2006/0129227 | A1 | 6/2006 | Hengelmolen |
| 2006/0180505 | A1 | 8/2006 | Alderson et al. |
| 2006/0202492 | A1 | 9/2006 | Barvosa-Carter et al. |
| 2007/0031667 | A1 | 2/2007 | Hook et al. |
| 2008/0035788 | A1* | 2/2008 | Kothera et al. ............. 244/99.8 |
| 2008/0145599 | A1 | 6/2008 | Khan et al. |
| 2008/0223542 | A1* | 9/2008 | Marti et al. ................ 164/158 |
| 2008/0290141 | A1 | 11/2008 | Shaw et al. |
| 2009/0044808 | A1 | 2/2009 | Guney |
| 2010/0154798 | A1 | 6/2010 | Henry |
| 2010/0159768 | A1 | 6/2010 | Lee |
| 2010/0198177 | A1 | 8/2010 | Yahiaoui |
| 2010/0252047 | A1 | 10/2010 | Kirk |

FOREIGN PATENT DOCUMENTS

| | | |
|---|---|---|
| EP | 0097517 B1 | 1/1984 |
| EP | 0106439 B1 | 4/1984 |
| EP | 0106440 A1 | 4/1984 |
| EP | 0497607 A1 | 8/1992 |
| EP | 1120651 A1 | 8/2001 |
| EP | 0772410 B1 | 11/2004 |
| EP | 1165865 B1 | 7/2005 |
| JP | 6-137799 | 5/1994 |
| JP | 8-19634 | 1/1996 |
| JP | 9-37578 | 2/1997 |
| JP | 2005-53439 | 11/2005 |
| JP | 2008-206928 | 9/2008 |
| KR | 10-2005-0117554 | 12/2005 |
| KR | 10-2007-0103457 | 10/2007 |
| WO | WO 91/01186 | 2/1991 |
| WO | WO 91/01210 | 2/1991 |
| WO | WO 96/03899 A1 | 2/1996 |
| WO | WO 97/09167 | 3/1997 |
| WO | WO 99/22838 | 5/1999 |
| WO | WO 99/25530 | 5/1999 |
| WO | WO 99/45407 | 9/1999 |
| WO | WO 00/53830 | 9/2000 |
| WO | WO 03/057769 A1 | 7/2003 |
| WO | WO 2004/012785 A1 | 2/2004 |
| WO | WO 2004/088015 A1 | 10/2004 |
| WO | WO 2005/065929 A1 | 7/2005 |
| WO | WO 2005/072649 A1 | 8/2005 |
| WO | WO 2006/021763 A1 | 3/2006 |
| WO | WO 2006/099975 A1 | 9/2006 |

OTHER PUBLICATIONS

Khansah, M.A., et al., *Modelling The Effects of Negative Poisson's Ratios in Continuous-Fibre Composites*, Journal of Materials Science, vol. 28, 1993, pp. 2687-2692.

Pickles, A.P., et al., *The Effects of Powder Morphology on the Processing of Auxetic Polypropylene (PP of Negative Poisson's Ratio)*, Polymer Engineering and Science, vol. 36, No. 5, Mid-Mar. 1996, pp. 636-642.

* cited by examiner

METHOD OF MAKING AN AUXETIC MESH

CROSS-REFERENCE TO RELATED APPLICATION

This application claims the benefit of U.S. Provisional Patent Application No. 61/291,060, filed Dec. 30, 2009.

The present invention pertains to a method of making an auxetic mesh that involves the extrusion of a polymeric material onto an open casting surface.

BACKGROUND

Auxetic materials have been made by a variety of methods, including etching, printing, die cutting, and laser cutting. Examples of various patent publications that describe auxetic articles and their methods of production include U.S. Pat. No. 6,878,320B1 to Alderson et al., U.S. 2005/0142331A1 to Anderson et al., U.S. 2005/0159066A1 to Alderson et al., U.S. 2005/0287371A1 to Chaudhari et al., U.S. 2006/0129227A1 to Hengelmolen, U.S. 2006/0180505A1 to Alderson et al., U.S. 2006/0202492A1 to Barvosa-Carter et al., U.S. 2007/0031667A1 to Hook et al. EP1,165,865B1 to Alderson, WO91/01210 to Evans et al., WO91/01186 to Ernest et al., WO99/22838 to Alderson et al., WO99/25530 to Lakes et al., WO00/53830 to Alderson et al., WO2004/012785A1 to Hengelmolen, WO2004/088015A1 to Hook et al., WO2005/065929A1 to Anderson et al., WO2005/072649A1 to Hengelmolen, WO2006/021763A1 to Hook, WO2006/099975A1 to Wittner, and in M. A. Nkansah et al, *Modelling the Effects of Negative Poisson's Ratios in Continuous-Fibre Composites*, JOURNAL OF MATERIALS SCIENCE, Vol. 28, 1998, pages 2687-2692, A. P. Pickles et al., *The Effects of Powder Morphology on the Processing of Auxetic Polypropylene (PP of Negative Poisson's Ratio)*, POLYMER ENGINEERING AND SCIENCE, Mid-March 1996, Vo. 36, No. 5, pages 636-642. Although auxetic articles have been described in a variety of documents, the literature has not described a sufficiently satisfactory method of making an auxetic mesh in a continuous operation.

SUMMARY OF THE INVENTION

The present invention provides a new method of making an auxetic mesh, which method is continuous and which method comprises (a) extruding a polymeric material onto an open casting surface that has an intended pattern disposed therein, the pattern being configured to create a mesh that exhibits auxetic properties; (b) wiping off excess extruded polymeric material from the open casting surface; (c) separating a cast mesh from the open casting surface; and (d) removing any residual polymeric material that is not of the intended mesh pattern.

In the present invention an auxetic mesh is made by extruding a polymeric material onto an open casting surface, and wiping off excess polymeric material from the casting surface. Any residual material that is not part of the intended pattern is removed. The present method is beneficial in that it allows auxetic meshes to be formed in a relatively consistent and continuous manner.

GLOSSARY

The terms set forth below will have the meanings as defined:

"auxetic" and/or "auxetic properties" means having a negative Poisson ratio;

"casting surface" means a surface that has recesses that are capable of receiving an extruded polymeric material;

"excess" means an amount exceeding an amount needed to make the desired auxetic mesh;

"extrude or extruding" means to force out through a die;

"intended pattern" means a desired three-dimensional image;

"mesh" means a structure that has a network of open spaces and that is substantially larger in first and second dimensions than in a third;

"open" means being able to receive a polymeric material normal to the surface;

"polymer" means a material that contains repeating chemical units, regularly or irregularly arranged;

"polymeric material" means a material that includes one or more polymers and optionally other ingredients;

"residual" means any excess material that resides after an attempt has been made, by wiping, to remove excess polymeric material;

"strand" means an elongated structure; and

"wiping" means to remove a quantity of material through exertion of a force upon that material;

DETAILED DESCRIPTION OF PREFERRED EMBODIMENTS

In practicing the present invention, an auxetic mesh can be made in a continuous manner. An auxetic mesh can be formed into a desired mesh pattern by casting the mesh such that minimum residual polymeric material remains on the casting surface. A means for removing that residual material may be employed to create the desired open work mesh.

Figure 1:
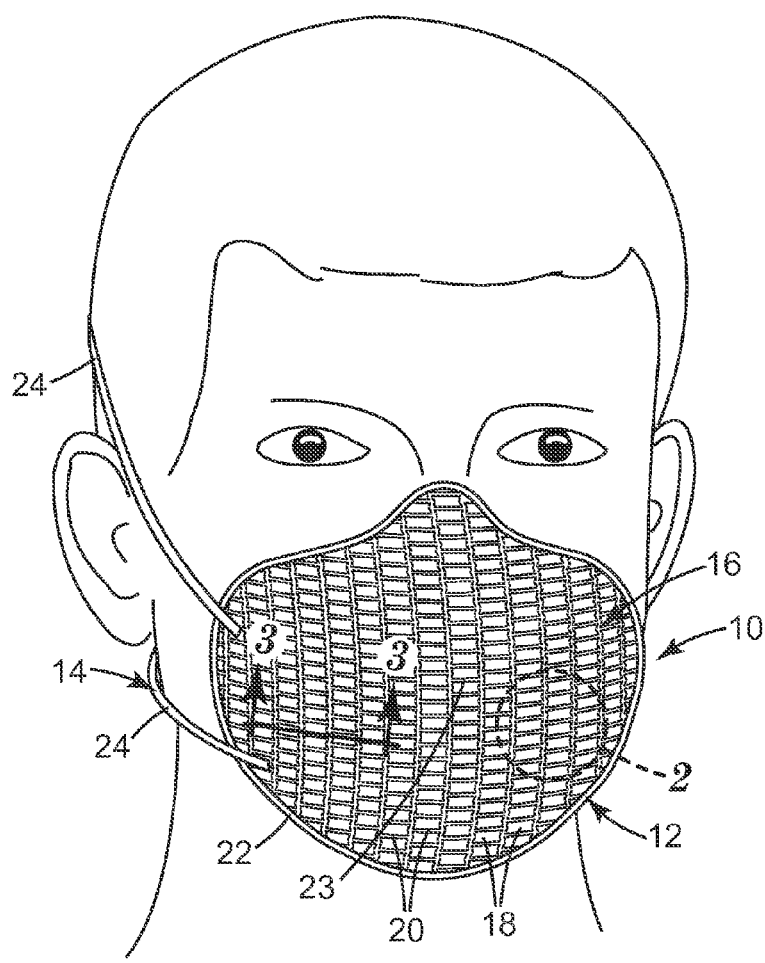
FIG. 1 shows a front perspective view of a filtering face-piece respirator 10 that can be made from an auxetic mesh produced in accordance with the method of the present invention.

FIG. 1 shows an example of a molded product, a filtering face-piece respirator 10 that uses an auxetic mesh that may be produced according to the method of the present invention. The auxetic mesh that is made according to the method of the present invention can be subsequently molded into a three-dimensional product such as a supporting structure for a respiratory mask. The filtering face-piece respirator 10 includes a mask body 12 and a harness 14. The mask body 12 has a support structure 16 that provides structural integrity to the mask body 12 and that provides support for a filtering structure 18 that resides behind the support structure 16. The filtering structure 18 removes contaminants from the ambient air when a wearer of the respirator 10 inhales. The support structure 16 includes an auxetic mesh 20 that is molded into a three-dimensional configuration, which defines the shape of the mask body 12. The auxetic mesh 20, when in its molded configuration, can provide the structural integrity sufficient for the mask body 12 to retain its intended configuration. The filtering structure 18 may be secured to the support structure 16 at the mask body perimeter 22. The filtering structure 18 also may be secured to the support structure 16 at the apex 23 of the mask body when an exhalation valve (not shown) is secured thereto. The harness 14 may include one or more straps 24 that enable the mask body 12 to be supported over the nose and mouth of a person. Adjustable buckles may be provided on the harness to allow the straps 24 to be adjusted in length. Fastening or clasping mechanisms also may be attached to the straps to allow the harness 14 to be disassembled when removing the respirator 10 from a person's face and reassembled when donning the respirator 10 from a person's face.

Figure 2:
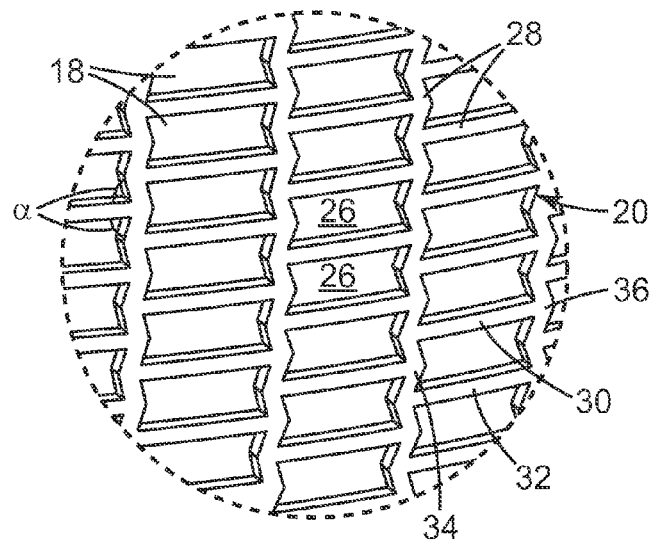
FIG. 2 is an enlarged view of the region circled in FIG. 1.

FIG. 2 shows an enlarged view of the open-work auxetic mesh 20. The auxetic mesh 20 includes a multitude of open spaces 26 that may be defined by polymeric strands 28. The strands 28 that define each open space 26 may include first and second sides 30 and 32 and third and fourth sides 34 and 36. The first and second sides 30 and 32 may be linear, whereas the third and fourth sides may be non-linear and include segments that are offset non-perpendicularly to the first and second sides 30 and 32. The offset segments do not form right angles to the first and second sides 30 and 32. Rather, they form a chevron end that has angles $\alpha$ that may be about 20 to 80 degrees, more typically about 40 to 70 degrees. Each opening typically has a size of about 5 to 50 square millimeters ($mm^2$), more typically about 10 to 35 $mm^2$. The Poisson ratio of the mesh typically is less than −0.2, more typically less than −0.4, and still more typically less than −0.7, but usually is not further less than −2.2. At the upper end, the Poisson ratio is not greater than zero. The multitude of openings in the mesh, after being molded, tend to maintain similar sizes. When tested according to the Cell Size Determination method described below, the standard deviation of cell sizes was less than 0.04, 0.03, and even less than 0.025.

Figure 3:
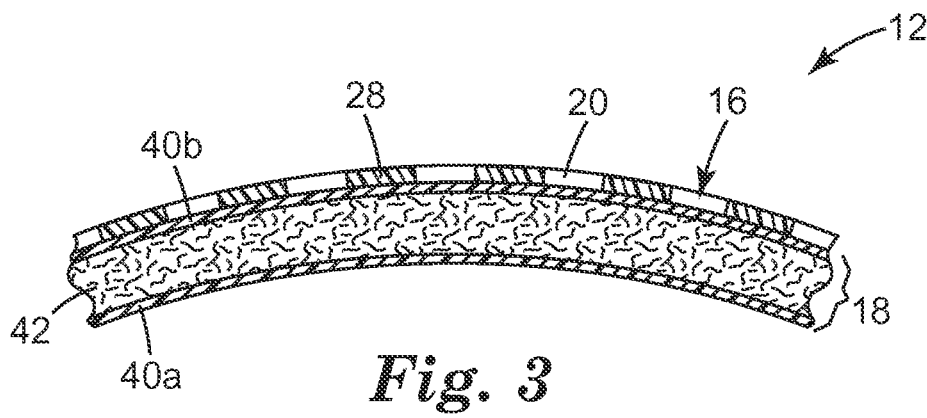
FIG. 3 is a cross-section of the mask body 12 taken along lines 3-3 of FIG. 1.

FIG. 3 shows a cross-section of the mask body 12, which includes the support structure 16 and the filtering structure 18. The support structure 16 typically has a thickness of about 0.60 to 0.85 millimeters (mm), and each strand 28 typically has an average cross-sectional area of about 0.1 to 3.5 $mm^2$, more typically of about 1.5 to 2.6 $mm^2$. The filtering structure 18 may include one or more cover webs 40a and 40b and a filtration layer 42. The cover webs 40a and 40b may be located on opposing sides of the filtration layer 42 to capture any fibers that could come loose therefrom. Typically, the cover webs 40a and 40b are made from a selection of fibers that provide a comfortable feel, particularly on the side of the filtering structure 18 that makes contact with the wearer's face. The cover webs often comprise polypropylene fibers. The mask body may be molded, for example, using the processes mentioned and described in U.S. Pat. No. 7,131,442B1 to Kronzer et al.

An auxetic mesh made according to the inventive method may be made from a variety of polymeric materials. Polymers suitable for auxetic mesh formation are generally either a thermoplastic or a thermoset material. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Thermoset materials, however, are curable materials that irreversibly cure, such as becoming crosslinked, when heated or cured. Once cured, the thermoset material will not appreciably melt or flow upon application of heat.

Examples of thermoplastic polymers that can be used to form auxetic meshes include: polyolefins, such as polyethylenes, polypropylenes, polybutylenes, blends of two or more of such polyolefins, and copolymers of ethylene and/or propylene with one another and/or with small amounts of copolymerizable, higher, alpha olefins, such as pentene, methylpentene, hexene, or octene; halogenated polyolefins, such as chlorinated polyethylene, poly(vinylidene fluoride), poly(vinylidene chloride), and plasticized poly(vinyl chloride); copolyester-ether elastomers of cyclohexane dimethanol, tetramethylene glycol, and terephthalic acid; copolyester elastomers such as block copolymers of polybutylene terephthalate and long chain polyester glycols; polyethers, such as polyphenyleneoxide; polyamides, such as poly(hexamethylene adipamide), e.g., nylon 6 and nylon 6,6; nylon elastomers; such as nylon 11, nylon 12, nylon 6,10 and polyether block polyamides; polyurethanes; copolymers of ethylene, or ethylene and propylene, with (meth)acrylic acid or with esters of lower alkanols and ethylenically-unsaturated carboxylic acids, such as copolymers of ethylene with (meth)acrylic acid, vinyl acetate, methyl acrylate, or ethyl acrylate; ionomers, such as ethylene-methacrylic acid copolymer stabilized with zinc, lithium, or sodium counterions; acrylonitrile polymers, such as acrylonitrile-butadiene-styrene copolymers; acrylic copolymers; chemically-modified polyolefins, such as maleic anhydride- or acrylic acid-grafted homo- or copolymers of olefins and blends of two or more of such polymers, such as blends of polyethylene and poly(methyl acrylate), blends of ethylene-vinyl acetate copolymer and ethylene-methyl acrylate; blends of polyethylene and/or polypropylene with poly(vinyl acetate); and thermoplastic elastomer block copolymers of styrene of the A-B or A-B-A type, where A represents a thermoplastic polystyrene block and B represents a rubbery block of polyisoprene, polybutadiene, or poly(ethylene/butylene), examples include linear, radial, star and tapered styrene-isoprene block copolymers, linear styrene-(ethylene-butylene) block copolymers, and linear, radial, and star styrene-butadiene block copolymers. The foregoing polymers are normally solid, generally high molecular weight, and melt-extrudable such that they can be heated to form molten viscous liquids which can be pumped as streams to the extrusion die assembly and readily extruded therefrom under pressure.

Examples of commercially-available polymers that may be suitable for use in making an auxetic mesh according to the present invention include: those sold as "ELVAX" ethylene-vinyl acetate copolymers, such as ELVAX 40W, 4320, 250, and 350; those sold as "EMAC" ethylene-methyl acrylate copolymers, such as EMAC DS-1274, DS-1176, DS-1278-70, SP 2220 and SP-2260; those sold as "VISTA FLEX" thermoplastic elastomers, such as VISTA FLEX 641 and 671; those sold as "PRIMACOR" ethylene-acrylic acid copolymers, such as PRIMACOR 3330, 3440, 3460, and 5980; those sold as "FUSABOND" maleic anhydride-polyolefin copolymers, such as FUSABOND MB-110D and MZ-203D; those sold as "HIMONT" ethylene-propylene copolymers, such as HIMONT KS-057, KS-075, and KS-051P; those sold as "FINA" polypropylenes, such as FINA 3860X; those sold as "ESCORENE" polypropylenes, such as ESCORENE 3445; the polymer sold as "VESTOPLAST 750" ethylene-propylene-butene copolymer; those sold as "SURLYN" ionomers, such as SURLYN 9970 and 1702; those sold as "ULTRAMID" polyamides, such as ULTRAMID B3 nylon 6 and ULTRAMID A3 nylon 6,6; those sold as "ZYTEL" polyamides, such as ZYTEL FE3677 nylon 6,6; those sold as "RILSAN" polyamide elastomers, such as BMNO P40, BESNO P40 and BESNO P20 nylon 11; those sold as "PEBAX" polyether block polyamide elastomers, such as PEBAX 2533, 3533, 4033, 5562 and 7033; those sold as "HYTREL" polyester elastomers, such as HYTREL 3078, 4056 and 5526; those sold as "KRATON" and "EUROPRENE SOL TE" styrene block copolymers, such as KRATON D1107P, G1657, G1750X, and D1118X and EUROPRENE SOL TE 9110, and 6205.

As mentioned above, blends of two or more materials may also be used in the manufacture of auxetic meshes. Examples of such blends include: a blend of 85 to 15 wt % poly(ethylene-vinyl acetate), such as "ELVAX" copolymer, with 15 to 85 wt % poly(ethylene-acrylic acid), such as "PRIMACOR" polymer, the poly(ethylene-vinyl acetate) component of the blend generally will have a weight average molecular weight, $M_w$, of 50,000 to 220,000 and will have 5 to 45 mol % of its interpolymerized units derived from the vinyl acetate comonomer and the balance of units from ethylene, the poly(ethylene-acrylic acid) component of the blend generally will have a $M_w$ of 50,000 to 400,000 and have 1 to 10 mol % of its interpolymerized units derived from acrylic acid and the balance from ethylene; a blend of 20 to 70 wt % poly(ethylene-propylene-butene) terpolymer having $M_w$ of 40,000 to 150,000 and derived from equally large amounts of butene and propylene and a small amount of ethylene, such as "VESTOPLAST 750" polymer, with 80 to 30 wt % isotactic polypropylene; a blend that contains from 15 to 85 wt % poly(ethylene-vinyl acetate) and 85 to 15 wt % poly(ethylene-methyl acrylate), such as "EMAC" polymer, the poly(ethylene-vinyl acetate) component of this blend can have a molecular weight and composition like that described above, the poly(methyl acrylate) component can have a $M_w$ of 50,000 to 200,000 and 4 to 40 mole % of its interpolymerized units derived from the methyl acrylate comonomer. When the auxetic mesh is used in connection with a filtering face-piece respirator, polypropylene may be preferred for use in the auxetic mesh to enable proper welding of the support structure to the filtering structure (filtering layers often comprise polypropylene as well).

The polymeric materials used to make the auxetic mesh typically have a Young's modulus of about 0.3 to 1900 Mega Pascals (MPa), more typically 2 to 250 MPa.

EXAMPLES

Cell Size Determination

Auxetic mesh cell size was determined using defined diameter rods that were mounted in a fixture to facilitate measurement of the open spaces or cells. The probe rods ranged in diameter from 0.0254 cm (centimeter) to 0.5334 cm, in 0.0254 cm increments. The cell size was measured by selecting the maximum size probe that fit into the cell without causing distortion of the cell shape prior to placement of the probe. This size was recorded, and the next cell size was measured and recorded until all cells contained within the molded mesh were measured and the cells tallied at each probe size.

Auxetic Mesh Formation Apparatus and Process

Figure 4:
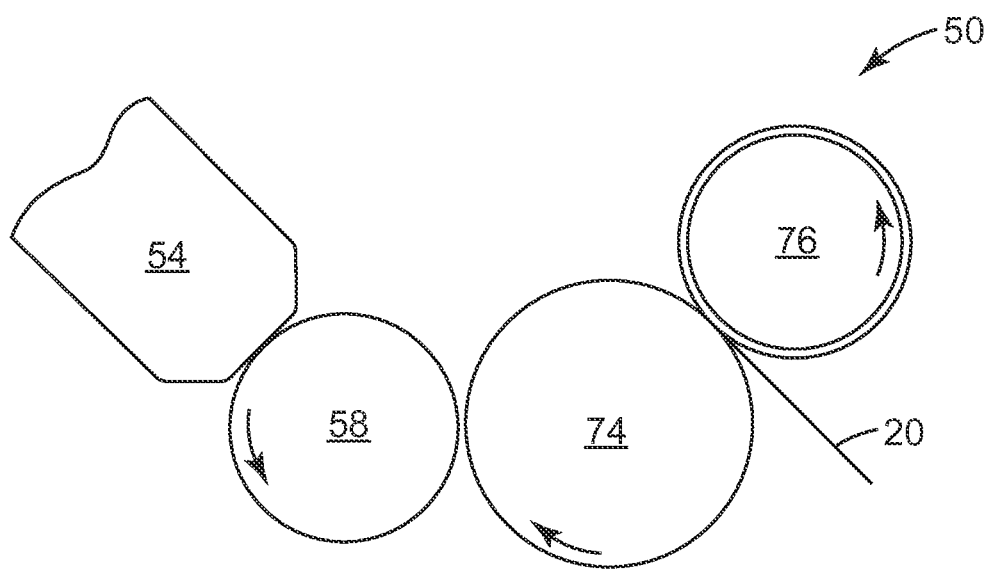
FIG. 4 is a schematic view of an apparatus 50 for making an auxetic mesh 20 in accordance with the present invention.

An auxetic web may be made using a system 50 that resembles the apparatus shown in FIG. 4. An extruder (such as used in the present examples, a 40 millimeters (mm) diameter twin-screw extruder) can be fitted with a pump (such as a gear pump) to deliver a molten polymer to an open casting surface. The delivery temperature may vary depending on the polymeric material composition. In the present examples, the molten polymer was delivered at a melt temperature of approximately 246° C. to a slot die 54, at an extrusion rate of 1.43 kg/hr/cm (kilogram per hour per length of die in centimeters). The polymer blend contained a three-part polymer composition that included pigment and anti-block agents. The polymer blend formulation is given below in Table 1. At the end of the slot die 54, the polymer blend is transferred to a casting roll 58 where the auxetic mesh is formed. The resulting mesh 20 is removed from the casting roll 58 where it is transferred to take-off roll 74. A back-up roll 76 contacts the take-off roll 74 to keep the auxetic mesh on the take-off role until the point of departure from the roll.

Figure 5:
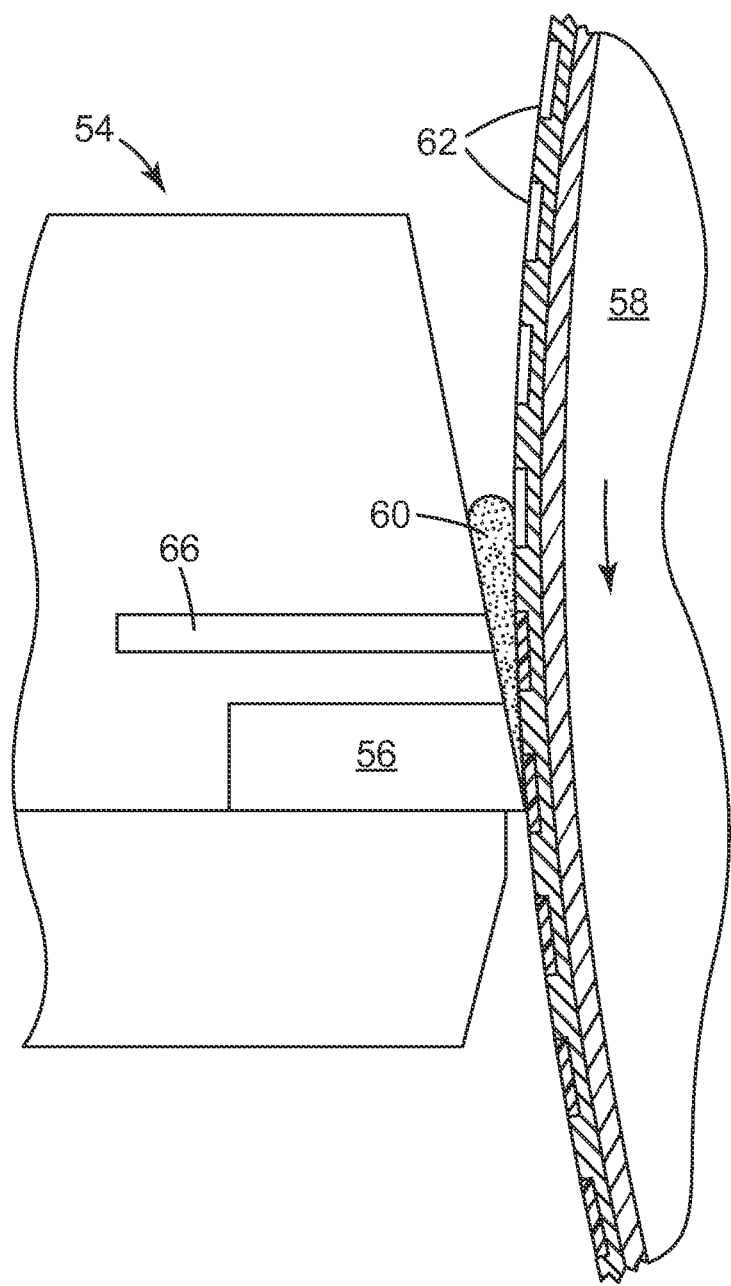
FIG. 5 is an enlarged view of the casting of the extruded polymeric material 60 onto the casting roll 58 in accordance with the present invention.

FIG. 5 shows the orientation of the slot die 54, doctor blade 56, and casting roll 58 in greater detail. The slot die 54 is maintained at a temperature sufficient to deliver liquid polymer and is positioned relative to the casting roll 58 such that a bank 60 of molten polymer is formed along a horizontal plane. The molten polymer 60 is forced into the casting roll cavity 62 by rotating the casting roll 58 against the doctor blade 56. The doctor blade 56 both forced molten polymer 60 into the casting roll cavity 62 and wiped the outer surface 64 of the casting roll 58 so that the molten polymer 60 is left in the cavity alone. Polymer that is removed from the polymer bank 60 via the casting roll 58 is replenished through the resin channel 66 of the slot die 54. Using this process, an auxetic mesh can be continually casted.

TABLE 1

Polymer Blend Composition

| Weight Percent | Material Type | Trade Name | Supplier | Supplier location |
|---|---|---|---|---|
| 41% | Olefin Elastomer | Engage 8490 | DuPont Dow Elastomers LLC. | Wilmington, Delaware |
| 41% | LLDPE | Hypel ™ LLDPE 52 | Entec Polymers, LLC | Houston, Texas |
| 15% | SEBS | Kraton G1657 | Kraton Polymers LLC | Houston, Texas |
| 3% | LDPE | Yellow Pigment compounded with Atmer 1753 Erucamide (Loading indicated an next line) | Clariant Masterbatches | Chicago, Ill |
| 0.12% | Erucamide | Atmer 1753 | Unichema North America | Minneapolis, MN |

During manufacture of the auxetic mesh, the doctor blade 56 is forced against the rotating casting roll 58 at a pressure sufficient to deliver polymer into the mold cavities. In the present examples, a pressure of 0.656 kN/cm (kilo-Newtons per lineal cm) was used to force molten polymer 60 to fill the channels or cavities 62 of the casting roll 58. The doctor blade 56 was maintained at a temperature of 246° C. The polymer bank 60 assures that sufficient polymer is present across the transverse length of the casting roll 58 to fill the channels 62 of the casting roll.

As shown in FIG. 4, the apparatus 50 may comprise a two-roll transfer system, which may include a take-off roll 74 with a chrome finish and a backup role 76 that has a rubber surface, to extract the cast auxetic mesh 20 from the casting roll 58 and to convey it to a collection apparatus. The takeoff role 74 contacts the casting roll 58 at an angle (here 225° degrees counter clockwise (the direction of rotation)) from the point of contact between the slot die 54 and casting roll 58. The backup roll 76 contacts the take-off roll 74 at an angle (here 135° degrees clockwise (direction of rotation)) from the point of contact between the casting roll 58 and take-off roll 74.

In the present examples, both rolls were maintained at a temperature of approximately 4.4° C. and had surface speeds of 5.0 m/min (meters per minute). The nip pressure between the casting roll 58 and take-off roll 74 was maintained at 4.37 N/cm; the nip pressure between the take-off roll 74 and the backup role 76 was 4.37 N/cm. After leaving the casting roll, the auxetic mesh 20 was transferred to the take-off roll 74 and was further cooled and conveyed through web handling rolls to a windup roll (not shown). The resulting mesh had a thickness of about 1.63 mm and a basis weight of 47 g/cm$^2$ (grams per square centimeter). The final wound roll of auxetic mesh contained an intermittent thin film of polymeric material between each of the auxetic pattern elements. All residual inter-element film was removed by hand using a tweezers. Other methods of residual film removal could include burning, heating, brushing, punching, and combinations thereof.

Figure 6:
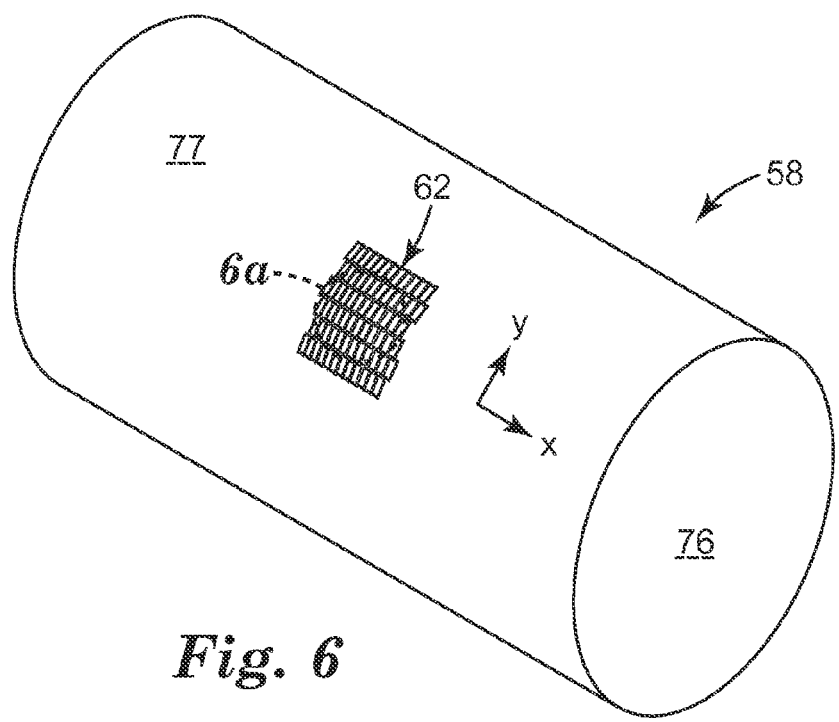
FIG. 6 is a perspective view of a casting roll 58 that may be used in accordance with the method of the present invention.
Figure 6A:
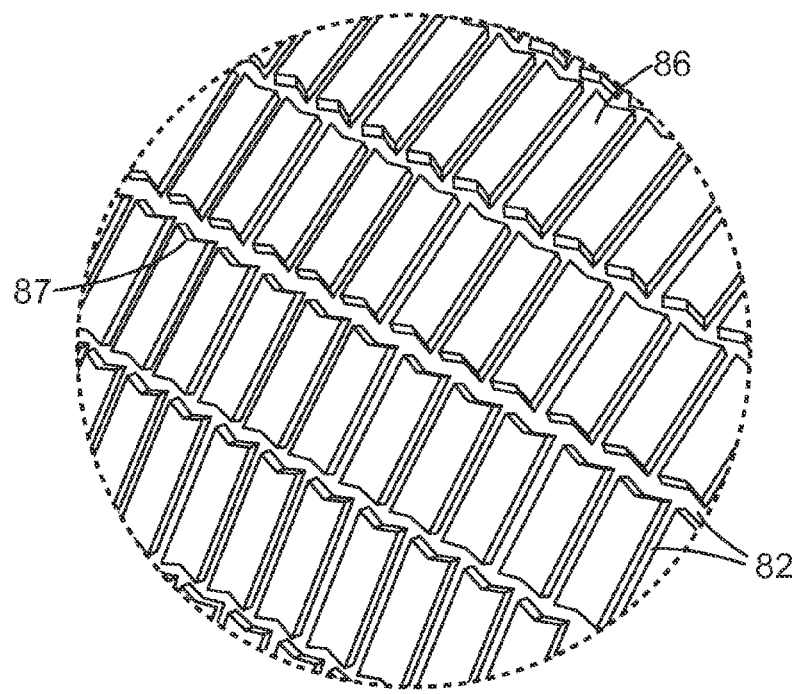
FIG. 6a is an enlarged perspective view of the region encircled in FIG. 6.

As shown in FIGS. 6 and 6a, the casting roll 58 has an auxetic-shaped cavity pattern 62 machined into its face. In the present examples, the cavity pattern 62 was cut into the face 77 of a 23.5 cm diameter, chrome-surfaced, steel roll 58. The auxetic-shaped pattern 62 of interconnecting channels 82 was machined into the face 77 of the casting roll 58 using a Harvey Tool #11815-30 Carbide Miniature Tapered End Mill, Harvey Tool Company LLC, Rowley, Mass. having a 6° included angle. The channels 82 of the auxetic pattern 62 were machined to a depth of 1.143 mm, with the rectangular channel formed by 3° tapered edge. The channels 82 are defined by uncut "island" areas 86 in the roll face 77, whereby the machined area constituted the channels 82. The unmachined islands 86 on the roll face 84, onto which the doctor blade 56 rides during mesh formation, were the shape of elongated hexagons that had isosceles concave 'chevron' ends 87.

Figure 7:
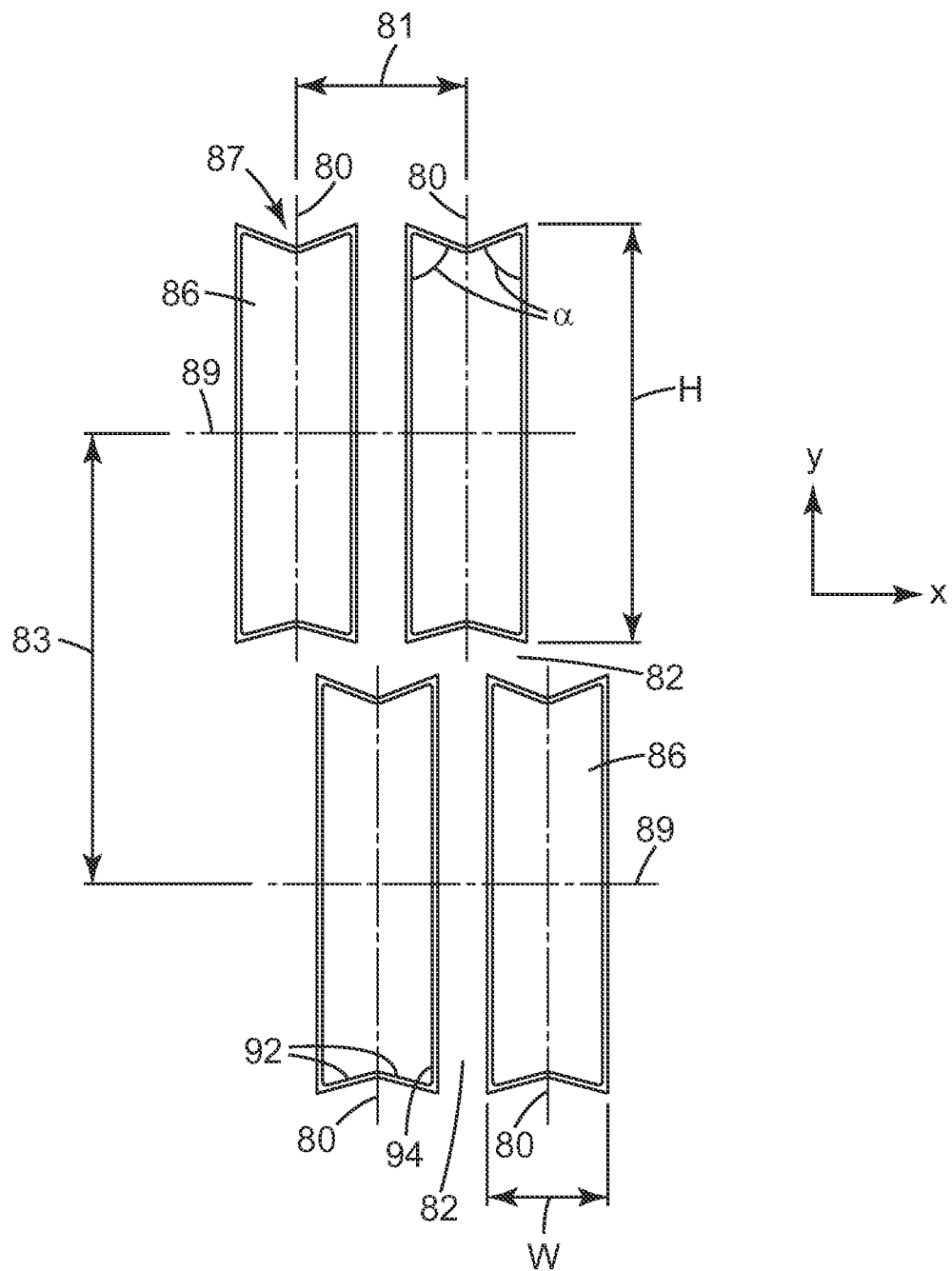
FIG. 7 is a plan view of an auxetic mold that may be used in connection with the present invention.
Figure 8:
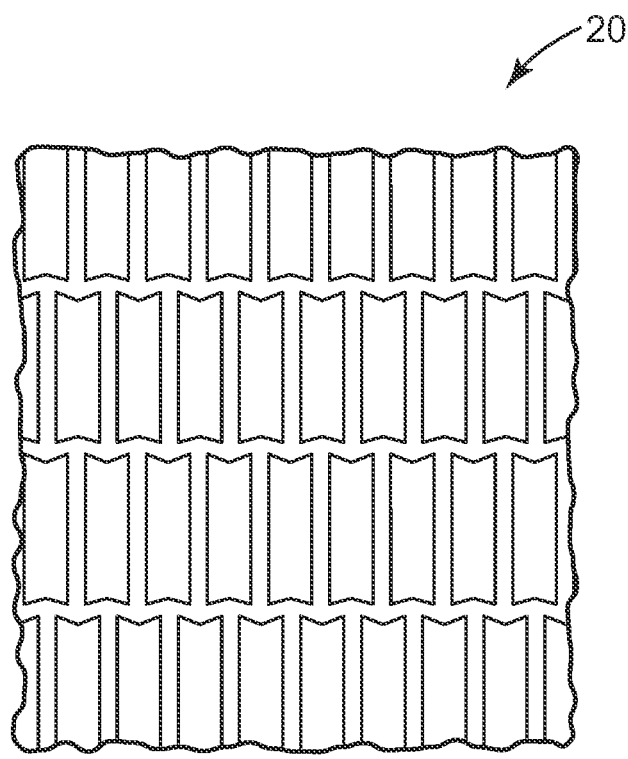
FIG. 8 is a front view of an auxetic mesh 20 made by the method of the present invention.

As shown in FIG. 7, the islands 86 may be oriented on the roll 76 such that their long axis 80 aligned with the circumstantial line of the roll 76. In the present examples, the islands 86 had an overall height H and width W of 11.1 mm and 3.1 mm, respectively. Two equally length lines, 92 extending 1.67 mm from the ends of each major side 94 of the hexagon, and meeting at its long axis centerline 80, formed the end chevron 87 of an island 86. Islands were spaced apart, relative to their centerlines, either along their long axis 80 or narrow (short) axis 89. The long axes of all islands were parallel to the circumstantial line of the casting roll 76. The narrow axes 89, of the islands were oriented along the axis of the casting roll 58. Alternating transverse rows of islands were offset from the row above or below by one half the width of each island. Transverse spacing of the islands 81 was 4.27 mm from long axis 80 to an adjacent long axis 80. Circumstantial spacing 83 of the islands was 11.88 mm from short axis 89 to short axis 89. Angle α was 69 degrees. With the islands 86 formed in this manner, a network of channels 82 was created. These channels 82 were filled with polymer during the casting process and acted as molds for the auxetic mesh 20. FIG. 8 shows an image of the molded auxetic mesh 20 produced as described above.

Auxetic Mesh Characterization Test Method

Auxetic mesh produced as described in the Auxetic Mesh Formation Apparatus and Process were evaluated for their auxetic properties through a tensile testing procedure. In this procedure, a 10.2 cm by 1.0 cm section of mesh was cut such that the long axes of the mesh cells were oriented in line with the transverse axis of the tensile testing apparatus. The crosshead speed of the tensile testing apparatus was maintained at 50.8 centimeters per minute until the sample was elongated to 50 and 100 percent of its original length. As is indicative of an auxetic structure, when placed under tension, the sample section increased in width in response to axial loading. The sample increased to a width of 105 percent of its original width at both elongations.

Three-Dimensional Molding of an Auxetic Mesh

Auxetic mesh produced as described in the Auxetic Mesh Formation Apparatus and Process section was molded into a three-dimensional cup shape. The auxetic mesh was molded into the cup shape of a respirator by draping a 21.5 cm by 25.5 cm section of mesh over an aluminum male mold. The mold had a generally hemispherical shape with an elliptical base with a major axis of 13.3 cm, and a minor axis of 10.5 cm, and a dome height of 4.4 cm. The hemispherical-shape mold was fixed to a rectangular aluminum plate that extended approximately 3.4 cm beyond the base of the mold. The section of auxetic mesh was draped over the mold so that it's edges extended beyond the outer perimeter of the base plate. A perimeter aluminum frame, with an interior cutout that mirrored the perimeter of the mold, was placed over the auxetic mesh and mold so that the mesh could be drawn over the mold without significant mesh distortion. The perimeter frame was then fixed to the base plate to hold the mesh in position against the mold. The mold, mesh, and securing plate assembly was placed in a preheated, air circulating oven for 20 minutes at a temperature of 105 C. After heating in the oven for the specified duration, the assembly was removed from the oven and was allowed to cool to room temperature. When the assembly reached room temperature, the perimeter frame was uncoupled from the base plate, and the resultant molded auxetic mesh removed from the mold. It was observed that the molded auxetic mesh retained its general auxetic structure, and it was shape-retaining even after compression in the mold. It was also noted that the auxetic mesh was able to easily adapt to the male mold shape without significant distortions to the mesh, such as folds or creases.

Respirator Cell Size Comparison

A respirator shell mesh was produced as described above in the Three-Dimensional Molding of Auxetic Mesh section was evaluated for cell size uniformity by surveying the size of the cells over the entirety of the mold structure. The cell size uniformity of the auxetic mesh was compared to the uniformity of shell meshes that were removed from commercially available filtering face-piece respiratory masks. Detailed measurements of the cell opening size and size distribution for each of several shell meshes were determined Respirator shell mesh was evaluated from a JSP 822 mask, manufactured by JSP Ltd, Oxfordshire, UK; a Venus 190 mask, produced by Nani Mumbai-MN, India; a 2200 mask inner shell, a 2200 mask outer shell, and a 2600 outer shell, all manufactured by Moldex-Metric, Culver City, Calif. The meshes were removed from the filter media to enable cell size measurement, the exception being the 3M auxetic mesh which was free standing. Each cell opening size was measured and recorded for the entire mesh using gauging probes as described above in Cell Size Determination.

The resulting measurements were compiled to provide the number of cells contained within the mesh of a given size, see Table 2. From this data the cell size distribution and standard deviation determined were determined and are given in Table 2.

TABLE 2

Cell Size Distribution

| Probe Size (cm) | JSP 822 | Venus 190 | Moldex 2200 Inner Shell | Moldex 2600 Outer Shell | Moldex 2200 Outer Shell | Molded Auxetic Mesh |
|---|---|---|---|---|---|---|
| 0.0254 | 1 | 1 | 0 | 1 | 2 | 0 |
| 0.0508 | 4 | 0 | 3 | 5 | 3 | 0 |
| 0.0762 | 3 | 0 | 2 | 5 | 5 | 0 |
| 0.1016 | 25 | 2 | 7 | 10 | 8 | 0 |
| 0.127 | 51 | 5 | 6 | 24 | 10 | 0 |
| 0.1524 | 92 | 7 | 14 | 20 | 34 | 0 |
| 0.1778 | 99 | 32 | 22 | 70 | 43 | 2 |
| 0.2032 | 96 | 32 | 22 | 77 | 81 | 11 |
| 0.2286 | 82 | 36 | 50 | 164 | 192 | 54 |
| 0.254 | 68 | 57 | 48 | 194 | 116 | 99 |
| 0.2794 | 66 | 162 | 77 | 286 | 88 | 222 |
| 0.3048 | 45 | 320 | 101 | 243 | 93 | 25 |
| 0.3302 | 49 | 135 | 106 | 27 | 104 | 0 |
| 0.3556 | 15 | 4 | 119 | 0 | 92 | 0 |
| 0.381 | 2 | 0 | 74 | 0 | 34 | 0 |
| 0.4064 | 0 | 0 | 62 | 0 | 32 | 0 |
| 0.4318 | 0 | 0 | 35 | 0 | 2 | 0 |
| 0.4572 | 0 | 0 | 28 | 0 | 1 | 0 |
| 0.4826 | 0 | 0 | 16 | 0 | 0 | 0 |
| 0.508 | 0 | 0 | 5 | 0 | 0 | 0 |
| 0.5334 | 0 | 0 | 0 | 0 | 0 | 0 |
| Standard Deviation | 0.0676 | 0.0444 | 0.0814 | 0.0510 | 0.0708 | 0.0234 |

The data shown in Table 2 reveals that the molded auxetic mesh has the narrowest distribution of cell size compared to non-auxetic molded meshes. Analysis of the data for standard deviation shows that the auxetic mesh has the smallest standard deviation of all six meshes measured. The reduction of cell size distribution in the auxetic mesh is a result of the deformation characteristics of an auxetic structure, which allows it to more readily conform to highly contoured shapes without gross deformation of the mesh, such as folding or drawing.

This invention may take on various modifications and alterations without departing from its spirit and scope. Accordingly, this invention is not limited to the above-described but is to be controlled by the limitations set forth in the following claims and any equivalents thereof.

This invention also may be suitably practiced in the absence of any element not specifically disclosed herein.

All patents and patent applications cited above, including those in the Background section, are incorporated by reference into this document in total. To the extent there is a conflict or discrepancy between the disclosure in such incorporated document and the above specification, the above specification will control.

What is claimed is:

1. A method of making an auxetic mesh, which method comprises:
   (a) extruding a polymeric material onto an open casting surface that has an intended pattern disposed therein, the pattern being configured to create an auxetic mesh;
   (b) wiping off excess extruded polymeric material from the open casting surface;
   (c) separating a cast mesh from the open casting surface after the excess polymeric material has been wiped off; and
   (d) removing any residual polymeric material that is not of the intended mesh pattern.

2. The method of claim 1, wherein the polymeric material is allowed to cool before the cast mesh is removed from the open casting surface.

3. The method of claim 1, wherein the residual polymeric material is removed by a step that includes burning the residual polymeric material.

4. The method of claim 1, wherein the step (c) occurs before step (d).

5. The method of claim 1, wherein the casting surface is disposed on a cylindrical role.

6. The method of claim 1, wherein the auxetic mesh produced according to the method of claim 1 exhibits a Poisson ratio of less than −0.2.

7. The method of claim 1, wherein the auxetic mesh produced according to the method of claim 1 exhibits a Poisson ratio of less than −0.4.

8. The method of claim 1, wherein the auxetic mesh produced according to the method of claim 1 exhibits a Poisson ratio of less than −0.7.

9. The method of making an auxetic mesh of claim 8, wherein the Poisson ratio is not further less than −2.2.

10. The method of claim 1, wherein the auxetic mesh comprises a thermoplastic or thermoset polymeric material.

11. The method of claim 10, wherein the polymeric material comprises a thermoplastic polymer selected from the group consisting of: a polyolefin, a halogenated polyolefin, a copolyester-ether elastomer, a copolyester elastomer, a polyamide, a copolymer of ethylene, an acrylonitrile polymer, an acrylic copolymer, a blend of polyethylene and polypropylene, and an elastomer block copolymer.

12. The method of claim 1, wherein the polymeric material comprises polypropylene.

13. The method of claim 1, wherein the polymeric material has a Young's modulus of 0.3 to 1900 Mega Pascals.

14. The method of claim 1, wherein the polymeric material has a Young's modulus of 2 to 250 Mega Pascals.

15. The method of claim 1, wherein the wiping step comprises forcing a blade against a rotating casting roll.

16. The method of claim 15, wherein the blade also delivers molten polymer into cavities in the casting roll.

17. The method of claim 1, wherein the residual polymeric material is removed by burning, heating, brushing, punching, or combinations thereof.

* * * * *